Figure 1:
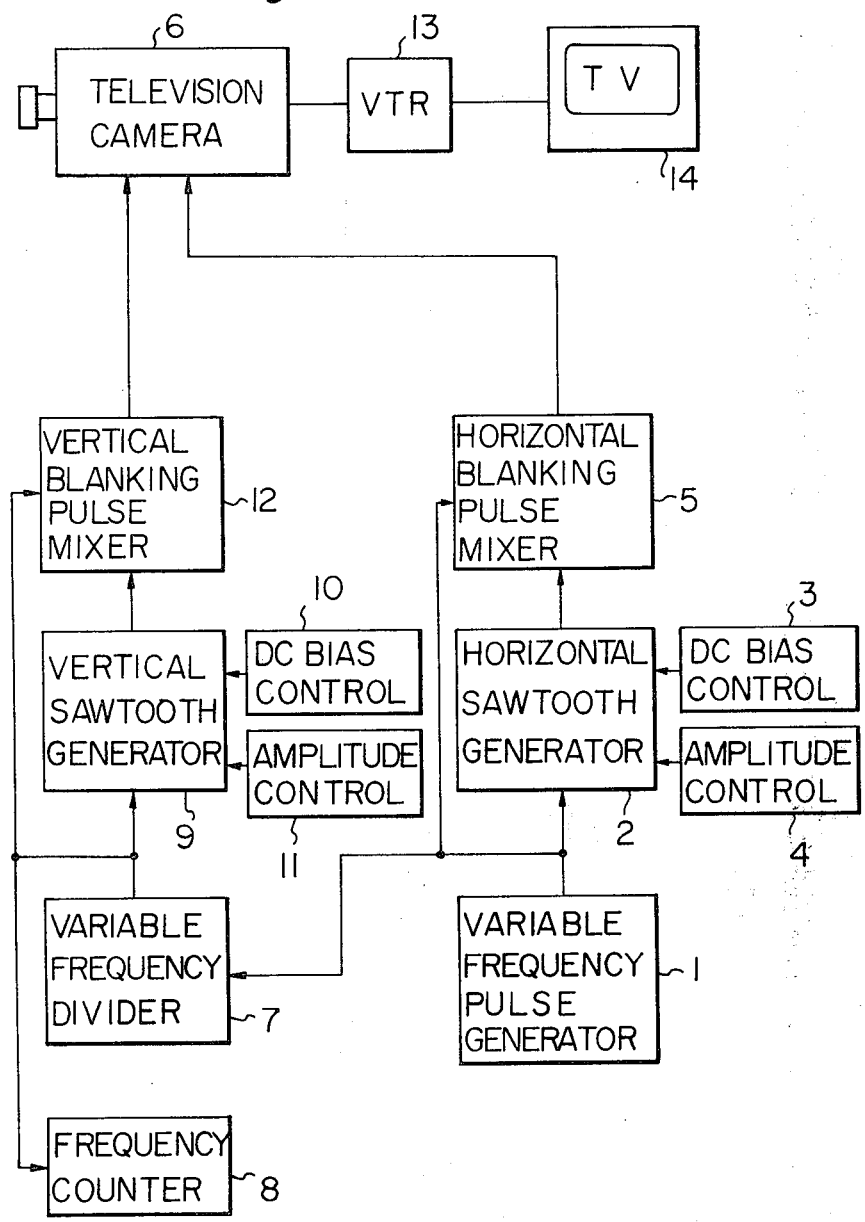

United States Patent [19]

Kogo et al.

[11] 3,984,630
[45] Oct. 5, 1976

[54] METHOD OF REDUCING THE SMEARING OF MOVING IMAGES

[75] Inventors: Hiroshi Kogo, Tokyo; Takashi Uematsu, Yokohama, both of Japan

[73] Assignee: Nissan Motor Co., Ltd., Japan

[22] Filed: May 5, 1975

[21] Appl. No.: 574,444

[30] Foreign Application Priority Data
May 7, 1974 Japan.............................. 49-49790

[52] U.S. Cl........................... 178/7.2; 178/DIG. 40
[51] Int. Cl.². ........................................ H04N 5/34
[58] Field of Search ......... 178/7.2, DIG. 40, 7.5 SE; 315/371

[56] References Cited
UNITED STATES PATENTS

| | | | |
|---|---|---|---|
| 3,497,614 | 2/1970 | Petrocelli et al..................... | 178/7.2 |
| 3,705,328 | 12/1972 | Torok......................... | 178/7.5 SE X |
| 3,761,615 | 9/1973 | Wreathall ............................ | 178/7.2 |

Primary Examiner—Robert L. Griffin
Assistant Examiner—Mitchell Saffian
Attorney, Agent, or Firm—Robert E. Burns; Emmanuel J. Lobato; Bruce L. Adams

[57] ABSTRACT

The smearing of moving images due to photoconductive and capacitive lags inherent to the photoelectric conversion target of a television camera can be removed by reducing the scan area of the target so that the electron beam traverses the target at a lower speed than the speed at which the corresponding portion of the image is traversed by the beam when the entire area of the target is scanned.

1 Claim, 2 Drawing Figures

METHOD OF REDUCING THE SMEARING OF MOVING IMAGES

The present invention relates to a method of eliminating the smearing of moving images caused by the inherent delay in photoelectrically converting an optical image focussed on a photoelectrical conversion target of a television camera at a fast rate. More specifically, it relates to a method of reducing both the scan area of the television camera and recording the video signal so that the reproduced image is free from the smearing due to the inherent delay in the photoelectrical conversion.

Use has been made of television cameras for measuring and monitoring the movement of fast-moving objects. Since the ability of the television camera to televise the fast moving object depends upon the number of frames per second, the image is scanned at an increased frame scan rate. However, with the increase in the number of frames per second, the smearing of moving images due to the inherent delay in the photoelectrical conversion of the image becomes the prime concern. This is particularly important when a vidicon camera tube is used because it possesses inherent properties of photoconductive lag and capacitive lag. The former refers to delay in change of conductivity of the photoconductor with changes of light level and the latter arises from the inability of the beam to return the scanned surface to a predetermined fixed potential in one scan.

In the conventional broadcasting television a sudden change in light level requires three scanning periods before the target potential reduces to 10% the potential induced by the light level. If the frame scan rate is higher than the conventional scan rate of 30 frames per second, it will require a greater number of scanning periods before the target potential reduces to the 10% value. It is found that if more than three scanning periods are required to reduce the target potential to that value, objectionable smearing will be produced in the reproduced image.

In accordance with the invention it has been shown that a reduction in the scanning area can result in the effective elimination of the smearing of moving images although the image is scanned at a higher frame scan rate than the conventional scan rate of 30 frames per second. Practically by reducing the scan area to a tenth of the conventional scan area while the image is scanned at a rate 10 times the conventional frame scan rate, the number of scanning periods required to allow the target potential to reduce to the 10% value can be made equal to that required in the conventional television system.

Therefore, the principal object of the invention is to provide a method of eliminating the smearing of moving images by reducing the scan area on the conventional photoelectric conversion target while the image is scanned at a rate higher than the conventional frame scan rate.

Figure 2:
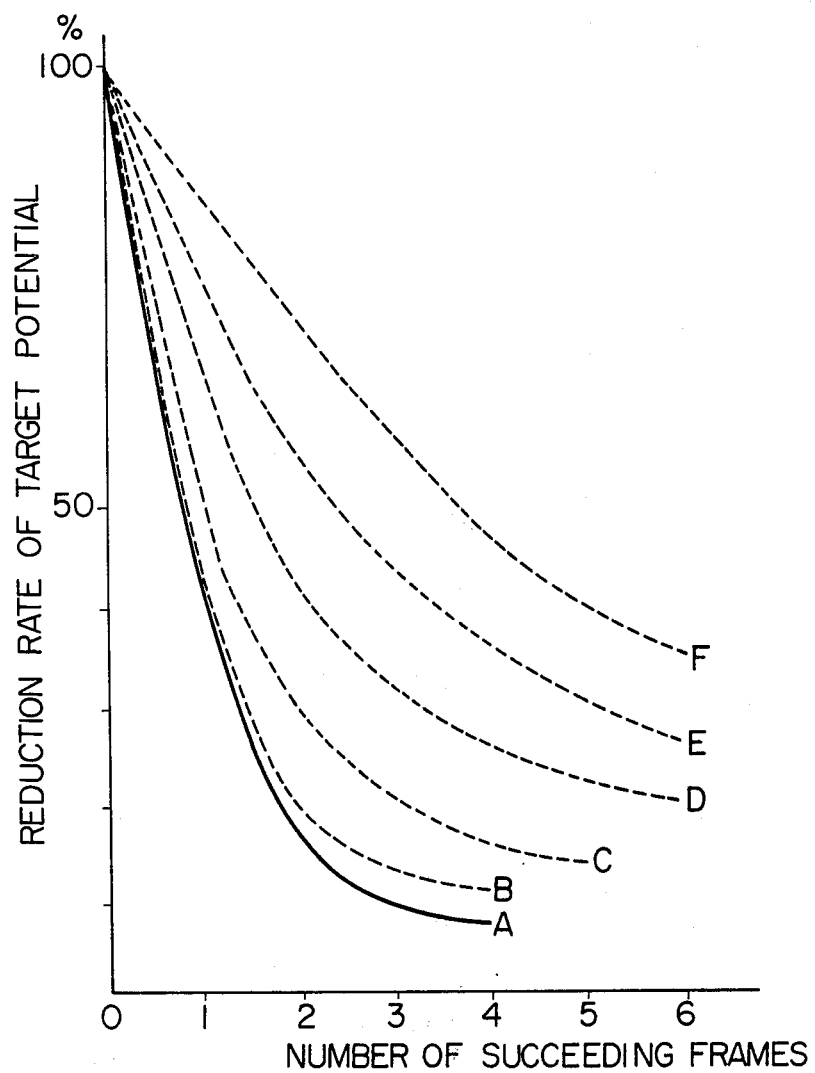

The invention will be described further with reference to the accompanying drawings, in which:

FIG. 1 is a schematic circuit diagram of an image pick-up and recording system used for testing the method of the invention; and FIG. 2 is a graph illustrating the results of the tests.

Reference is now made to FIG. 1 in which a circuit diagram of a variable scan video recording system is schematically shown. The system was used to evaluate the method of eliminating the smearing of moving images.

In FIG. 1, a variable frequency pulse generator 1 is used to generate a train of pulses occurring at a repetition frequency determined by manual adjustment of the timing element of the pulse generator 1. The pulse generator 1 feeds its output to a horizontal sawtooth generator 2 of a conventional construction with dc bias and amplitude controls 3 and 4 respectively to provide a manual control of the amplitude and dc pedestal of the sawtooth wave. The sawtooth generator 2 couples its output to a horizontal blanking pulse mixer 5 to which is also applied the output from the variable frequency pulse generator 1. The blanking pulse mixer 5 is also of a conventional circuitry and generates blanking pulses in synchronism with the output from the pulse generator 1 and combines them with the sawtooth waveforms so that a horizontal blanking pulse occurs between successive sawtooth wave pulses, and applies its output to a known television camera 6 with a conventional television camera tube such as Image Orthicon or Vidicon tube. Concurrently, the output from the variable frequency pulse generator 1 is applied to a variable frequency divider 7 which divides the input frequency into a lower frequency which is alsa manually variable to provide a desired frame scan rate. The frame scan rate is monitored by a frequency counter 8 coupled to the frequency divider 7. The output from the frequency divider 7 is also coupled to a vertical sawtooth generator 9 with a similar combination of dc bias control 10 and amplitude control 11 to that described above. A vertical blanking pulse mixer 12 is provided which is coupled to the output of the vertical sawtooth generator 9 and the variable frequency divider 7 to insert a vertical blanking pulse between successive vertical sawtooth wave pulses. The output from the vertical blanking pulse mixer 12 is applied to the television camera 6 to vertically sweep the photoelectric conversion target of the camera tube (not shown) within the camera 6. A moving object is focussed on the photoelectric conversion target and scanned by conventional manner to generate a video signal which is fed into a video tape recorder 13 of the conventional type. A monitor television set 14 is coupled to the video tape recorder 13 to reconstruct the original image.

To evaluate the capability of the camera 6 to eliminate the smearing of moving images, a Vidicon type camera tube with a silicon target is employed.

Prior to description of the operation of circuit of FIG. 1, description will now be made as to the theoretical aspect of the invention. There are two types of fast frame scan rate television system; the first is to use a higher frame scan rate without altering the power of resolution, the second is to use a higher frame scan rate while maintaining the line frequency (frame scan frequency times the number of horizontal lines) with the consequential decrease in the power of resolution, and the third is to employ both of the above.

It is known that there exists the following relation between the maximum transmission bandwidth $B_{max}$ of the video signal obtained from the television camera, the frame scan frequency $f_p$, the number of horizontal scannning lines $n$ and the aspect ratio W/H (width/height) of the photoelectric conversion target:

$$B_{max} \alpha f_p \cdot W/H \qquad (1)$$

Assume that the first method as described above be employed, and a frame scan rate be increased to $m$ times the conventional frame scan frequency of 30 Hz and since the number of horizontal scanning lines is assumed constant, the following relation holds:

$$B_{max} \alpha\, m \cdot f_p \cdot n^2 \cdot W/H \tag{2}$$

The maximum transmission bandwidth which is $m$ times the original bandwidth is thus obtained.

In considering the second method, let the number of scanning lines be $1/m$ times the conventional number. The resolving power along the scanning lines is also reduced to $1/m$ the original resolving power, and the frame scan frequency increased to a value $m$ times the original 30 Hz. Then, the following relation is obtained:

$$B_{max} \alpha\, 1/m \cdot n^2 f_p \cdot W/H \tag{3}$$

Therefore, the transmission bandwidth which is $1/m$ the original is obtained.

Considering now the third method, let the frame scan frequency be $a$ times the original frequency, and let the number of scanning lines be $1/b$ times the original number of lines which is 525, while maintaining the power of resolution. Then, the frame scan frequency becomes $ab$ times the original frequency. Further, let the resolving power along the scanning line be reduced to $1/b$ times the original value. The following relation is obtained:

$$B_{max} \alpha\, a/b \cdot n^2 \cdot f_p \cdot W/H \tag{4}$$

Therefore, the maximum bandwidth which is $a/b$ times the original is obtained.

Assume that the scanning area of the target be reduced to $1/b^2$ times the original area by reducing the horizontal and vertical dimensions to $1/b$ respectively, and the raster area of the monitor television screen be similarly reduced at the same reduction ratio. Then, the resolution that is the same as that available with the conventional standard television system is obtained.

According to the present experiments, it is assumed that $a = b$ for simplicity. The invention will be further described with reference to the following experiments:

EXPERIMENTS

Run 1

For comparison purposes, the variable frequency pulse generator 1 was adjusted so that it produces a pulse repetition frequency of 15.75 kHz which is the standard line frequency used in the conventional system. Also, the variable frequency divider 7 was adjusted to provide an output having a repetition frequency of 30 Hz that is, 30 frames per second. The number of scanning lines was thus 525. The dc bias control 3 and 10 and amplitude control 4 and 11 were also adjusted such that the full target area of the television camera 6 is scanned. A moving object (not shown) was focused on the target and scanned to generate a video signal which was recorded on the video tape recorder 13. The recorded video signal was reproduced on the monitor television set 14 and a measurement was made to determine the number of frames before the target potential reduces to the 10% value. It was found that three frames were required before the target potential was reduced to that value as shown in solid curve A in FIG. 2.

Run 2

The variable frequency pulse generator 1 was adjusted to double the frequency as used in the run 1 experiment (31.5 kHz). The variable frequency divider 7 was adjusted so that it divides the input frequency by 250 (the number of scanning lines) so that the frame scan frequency obtained was 126 Hz. The entire area of the target was scanned as in the previous run. The result was plotted as indicated by dashed line D in FIG. 2.

Run 3

The frequency of the pulses generated by the generator 1 was increased to 47.25 kHz which is three times the original frequency and then divided by 175 (the number of scanning lines) so that the frame scan frequency was 270 Hz. The entire area of the target was scanned as in the previous runs. The result was plotted as is indicated by dashed line C in FIG. 2.

Run 4

The repetition frequency of the pulses generated by the pulse generator 1 was increased to 63 kHz which is four times the original frequency used in the run 1 experiment and then divided by the number of scanning lines which is 125 so that the frame scan frequency was 504, that is, 504 frames per second. The entire area of the target was scanned as in the previous runs. The result was plotted as is indicated by the dashed line F in FIG. 2.

Run 5

The same line frequency (63 kHz) was used as in run 4. The number of scanning lines used in run 4 was doubled so that the target was scanned at half the rate used in run 4. The result was plotted as indicated by dashed line E in FIG. 2.

Run 6

The target was scanned at the same frame scan rate with the same number of scan lines as in the run 4 except that the dc bias control 3 and 10 and amplitude control 4 and 11 were adjusted in a manner to reduce the scan area to 1/16 of the target area. The reduction rate of target potential was plotted as shown in dashed line B in FIG. 2. With the reduction in the scan area, the electron beam traverses the target surface at a lower speed than the speed at which the corresponding portion of the target is scanned at the same frame scan rate when the beam is deflected to the full size of the target as in the previous test runs. As shown in the dashed line B, the delay caused by the photoconductive and capacitive lags of the target can be reduced to a level in the neighborhood of the value of the conventional television system and favorably compared with the result of run 4 (dashed line F).

What is claimed is:

1. A method of reducing the smearing of moving images employing a television camera including a photoelectrical conversion target, a source of electron beam, horizontal and vertical beam deflection means, and means for supplying said beam deflection means with horizontal and vertical beam deflection signals, comprising the steps of:

focussing the image of a moving object on said target;
controlling the amplitude of said beam deflection signals in such manner as to reduce the scan area of said beam so that the beam traverses the surface of said target at a speed lower than the speed at which the corresponding portion of said target is scanned when the entire area of the target is scanned; and
controlling the frequency of said vertical beam deflection signal in such a manner that the target is scanned at a higher frame scan rate.

* * * * *